T. D. BRINKOP.
SWIVEL UNION.
APPLICATION FILED MAR. 22, 1912.
1,043,294.
Patented Nov. 5, 1912.
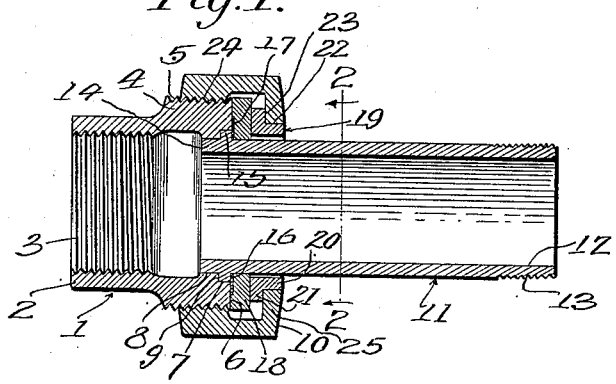
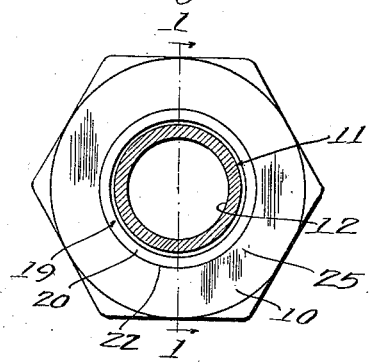
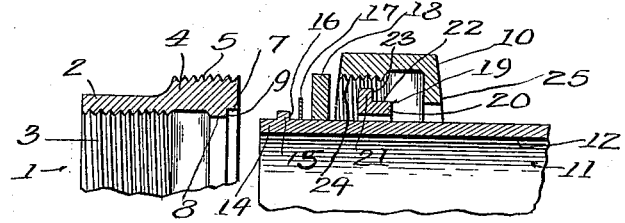
Witnesses:
Inventor
Thomas D. Brinkop
by Semer G. Wells,
his Attorney.

UNITED STATES PATENT OFFICE.

THOMAS D. BRINKOP, OF LOS ANGELES, CALIFORNIA.

SWIVEL UNION.

1,043,294.   Specification of Letters Patent.   Patented Nov. 5, 1912.

Application filed March 22, 1912. Serial No. 685,634.

*To all whom it may concern:*

Be it known that I, THOMAS D. BRINKOP, a citizen of the United States, residing at Los Angeles, county of Los Angeles, State of California, have invented a new and useful Swivel Union, of which the following is a specification.

My object is to improve the details of a swivel union and one of the leading features of my invention is a friction ring between the packing and the movable flange for the purpose of protecting the packing from wearing on the side; and my invention consists of the novel features herein shown, described and claimed.

In the drawings—Figure 1 is a longitudinal sectional detail on the line 1—1 of Fig. 2, the parts being shown assembled. Fig. 2 is a cross section on the line 2—2 of Fig. 1 and looking in the direction indicated by the arrow. Fig. 3 is a view analogous to Fig. 1, the parts being shown separated, as before the union nut is screwed into place.

Referring to the drawings in detail: Swivel unions are usually put into work so that the male member to which the union nut is screwed is rigid with the work while the other member is swiveled.

The male member 1 consists of a sleeve 2 which has internal screw-threads 3 to receive the pipe and the enlarged ring 4 which has an external screw-thread 5 to receive the union nut, the end face 6 of the ring being flat in a plane cross-wise of its axis and there being an enlarged bore 7 extending inwardly from the flat face 6 and a smaller bore 8 extending inwardly from the bore 7, there being a shoulder 9 connecting the inner end of the bore 7 to the outer end of the bore 8, said shoulder 9 being parallel with the flat face 6 and the bore 8 being larger than the passage through the screw-threads 3.

The union nut 10 may be of any of the well known forms or materials.

The swivel member 11 is preferably of considerable length and has a bore 12 approximately the same size as the passage through the pipe, said member serving as a piece of the pipe line. The outer end has exterior screw-threads 13. The inner end of the swivel member 11 is finished to form the pintle 14, fitting in the bore 8. A flange 15 extends circumferentially from the pintle 14 and fits in the bore 7 against the shoulder 9, the outer face 16 of the flange 15 being substantially on a plane with the flat face 6 of the male member 1.

The friction ring 17 fits closely around the swivel member 11 against the face 16 and extends outwardly part way across the face 6. The fabricated packing 18 fits around the swivel member 11 against the friction ring 17 and against the remaining portion of the flat face 6.

The follower 19 is L-shaped in cross-section and fits around the swivel member 11 against the fabricated packing 18. In plan the outer half 20 of the follower 19 is smaller in diameter than the inner half 21, thus forming a circumferential bearing surface 22 and a flat bearing surface 23.

The interiorly screw-threaded portion 24 of the union nut 10 fits upon the external screw-threads 5 and the flanged portion 25 fits around the bearing surface 22 against the flat surface 23, so as to press the follower 19 against the fabricated packing 18 and press the packing against the friction ring 17 and the flat surface 6 and press the friction ring 17 against the flange 15 and hold the flange 15 against the shoulder 9. When the union nut has been sufficiently tightened, the packing 18 will make a close joint between the two members of the union by pressing against the flat face 6 and against the periphery of the swivel member 11. When the swivel member is rotated relative to the stationary member the flange 15 rubs upon the friction ring 17. The friction ring 17 is held stationary between the fabricated packing 18 and the flat face 6. The swivel member 11 is held from lateral or bending movement by the fitting of the pintle 14 and the flange 15 in the bores 7 and 8. There is no friction upon the union nut 10 when the swivel member rotates and the only friction upon the fabricated packing 18 is on the internal face 26 which fits against the periphery of the swivel member 11.

I call especial attention to the fact that the supporting flange 15 is inside of the fabricated packing 18 and not in contact with the packing and that an end or sidewise thrust upon the swivel member comes directly against the rigid member instead of being transmitted through the packing as in the old constructions. The supporting flange 15 need not be pinched between the friction ring 17 and the shoulder 9 because the friction ring pressing against the flat face 6 will support the packing. This construction greatly reduces the wear and tear upon the packing.

The details of construction may be varied in many ways without departing from the spirit of my invention as set up in the following claims.

I claim—

1. A swivel union comprising a member having a flat end face and a bearing extending inwardly from the flat end face; a second member having a supporting flange fitting in the bearing flush with the flat end face; a friction ring fitting upon the second member against the supporting flange and overlapping a portion of the flat end face; a packing ring fitting against the friction ring and the remaining portion of the flat end face; a follower fitting against the packing ring; and a nut embracing the follower and screw-seated upon the first member.

2. A swivel union comprising an exteriorly screw-threaded head having a flat end face and having a bore extending longitudinally from the flat end face and having a smaller second bore extending inwardly concentric with the first bore, there being a flat transverse face connecting the two bores; a pintle fitting in the second bore; a supporting flange fitting in the first bore; a nipple extending outwardly from the supporting flange; a friction ring fitting around the nipple against the supporting flange and over-lapping part of the flat end face; a packing ring fitting around the nipple against the friction ring and against the remaining portion of the flat end face; a follower fitting around the nipple against the packing ring; and a union nut embracing the follower and screw-seated upon the head.

THOMAS D. BRINKOP.

Witnesses:
BERTHA McMASTER,
D. A. WILKINS.

Copies of this patent may be obtained for five cents each, by addressing the "Commissioner of Patents, Washington, D. C."